United States Patent Office

3,538,013
Patented Nov. 3, 1970

3,538,013
METHOD OF IMPROVING HALOPHOSPHATE PHOSPHOR BY TREATING THE PHOSPHOR WITH DIETHYLENETRIAMINE PENTAACETIC ACID
Eugene A. Graff, Cedar Grove, N.J., assignor to Westinghouse Electric Company, Pittsburgh, Pa., a corporation of Pennsylvania
No Drawing. Filed Aug. 13, 1968, Ser. No. 752,157
Int. Cl. C09k 1/36
U.S. Cl. 252—301.4          7 Claims

ABSTRACT OF THE DISCLOSURE

Method of improving the light output and maintenance of calcium halophosphate phosphor. The fired phosphor is treated with diethylenetriamine pentaacetic acid (DTPA) during milling or during a separate washing. The DTPA complexes metals which have not been incorporated into the phosphor structure. The resulting DTPA treated phosphor exhibits superior initial lumen output as well as improved lumen maintenance.

BACKGROUND OF THE INVENTION

The alkaline-earth metal halophosphate phosphor continues as the keystone of the fluorescent lamp industry. The basic phosphor disclosed in U.S. Pat. 2,488,733, by McKeag et al. has been constantly improved.

The calcium halophosphate phosphor having the formula $3Ca_3(PO_4)_2 \cdot Ca(F,Cl)_2$ is most commonly activated by antimony and manganese. Various other activators and additives have been disclosed as being useful in improving phosphor performance. The phosphor is generally prepared by firing a raw mix containing the constituents required to satisfy the formulation. It is felt that such solid state firing gives rise to local concentration excesses of constituents which are not entirely incorporated into the phosphor crystal. Typically, the fired phosphor is washed with dilute nitric acid and/or treated with a sequestering agent; specifically, ethylenediamine tetraacetic acid has been used as the sequestering agent. The nitric acid washing is thought to improve the phosphor performance by removing ultrafine particles. The sequestering agent is known to remove excess metals such as calcium, antimony, and manganese, from the treated phosphor. It has been found necessary, as disclosed by Martyny U.S. Pat. 3,047,512, to employ at least 3% by weight ethylenediamine tetraacetic acid to improve the phosphor performance.

SUMMARY OF THE INVENTION

It is an object of this invention to provide a method for improving the lumen output and maintenance characteristic of calcium halophosphate phosphor.

It is a further object of the invention to provide a method for sequestering and removing unincorporated metallic constituents from the fired calcium halophosphate phosphor to improve the phsophor performance in fluorescent lamps.

It is a further object to provide a method for improving the phosphor by further insuring removal of excess metal not incorporated into the phosphor structure by utilizing a sequestering agent which forms metal chelates exhibiting a high stability constant.

The foregoing objects and others which will become apparent as the description proceeds are achieved by treating the halophosphate phosphor with an aqueous solution containing a small proportion of diethylenetriamine pentaacetic acid, hereafter referred to as DTPA. The DTPA can be added to a water vehicle to thoroughly wet the phosphor during ball milling or after ball milling during a separate washing step. The DTPA is added in an amount of at least 0.01 weight percent of the phosphor to be treated. The preferred method is to include DTPA in an amount of about 0.1 percent by weight of the phosphor in the ball milling procedure following firing. This is preferred since ball milling after firing is practiced in any case and the DTPA treatment is readily incorporated into present production practices. There is no appreciable difference in the phosphor performance between the two modes of DTPA treatment. The DTPA sequestering agent forms very stable metal chelates with metals which are commonly added to halophosphate phosphors, such as manganese, cadmium, strontium. This stability of DTPA metal chelates insures that the metals will not dissociate and recontaminate the phosphor, but will be completely removed with the DTPA which is separated from the phosphor during a final rinsing step.

DESCRIPTION OF THE PREFERRED EMBODIMENT

The halophosphate phosphor is prepared by conventional methods by which typical raw mix constituents, such as $CaHPO_4$, $CaCO_3$, $CaF_2$, $MnCO_3$, $Sb_2O_3$, $CdCO_3$, $NH_4Cl$ or $CaCl_2$ are mixed together in proportions required to satisfy the halophosphate formulation. As a specific example, a raw mix is prepared by thoroughly mixing the following constituents: 3 moles of $CaHPO_4$; 1.2 moles of $CaCO_3$; 1 mole of $CaF_2$; 0.5 mole of $CaCl_2$; 0.08 mole of $MnCO_3$; 0.05 mole of $Sb_2O_3$; 0.05 mole of $CdCO_3$. The raw mix is fired in a covered crucible or in nitrogen in a furnace at from 1000–1200° C. for several hours to form the phosphor. This specific example is only illustrative, and the present method can be used to process any halophosphate phosphor as described in the aforementioned U.S. Pat. No. 2,488,733.

The phosphor is allowed to cool and is then crushed, and hammer milled. The phosphor is then placed in a conventional ball mill with finely divided diethylenetriamine pentaacetic acid (DTPA) in an amount of 0.1 weight percent of the phosphor.

The invention can be practiced for example by loading a conventional ball mill with 160 kilograms of calcium halophosphate phosphor, about 80 liters of deionized water, and 160 grams of diethylenetriamine pentaacetic acid (DTPA). The mixture is milled for about one hour and the solids are separated by decantation. The average particle size of the phosphor is from about 7–10 microns in diameter.

The resultant milled product is desirably washed with a dilute acid, such as a 0.1 normal nitric acid solution, and then washed or rinsed with deionized distilled water to remove any residual acid and the DTPA metal chelates. The washed phosphor is dried and is ready for application in fluorescent lamps.

The invention can similarly be practiced with a continuous vibration milling device. The halophosphate phosphor and the preferred weight percent addition of DTPA are mixed together in deionized water forming a slurry which is continuously fed to this device and passed through a chamber containing moderate sized pebbles which are continuously vibrated. The solid materials are again separated from the slurry, after it has passed through the milling chamber, by decantation after dilution. The nitric acid treatment and the separation of the DTPA are effected as described with respect to the ball milling technique.

In yet another embodiment, the invention can be practiced by treating the phosphor with DTPA after the ball milling or continuous vibration milling. This is achieved by suspending the DTPA in a slurry with enough deionized water to keep the material from agglomerating. The DTPA is present in the slurry in an amount of preferably 0.1 percent by weight of the phosphor treated. The DTPA added to the slurry should be in an amount of at least 0.01 weight percent of the halophosphate phosphor included therein.

The use of diethylenetriamine pentaacetic acid as a sequestering agent for treating halophosphate phosphor offers several practical improvements over prior art treating agents. The amount of DTPA required to achieve increased phosphor lumen output and improved maintenance is very small. An improvement in lumen output is shown when the halophosphate phosphor is treated with DTPA in an amount of at least 0.01 weight percent of the phosphor, and preferably in an amount of about 0.1 weight percent of the phosphor. The DTPA can be employed in larger amounts in treating the halophosphate phosphor. The calcium halophosphate phosphor treated with DTPA in an amount of up to 10 weight percent of the phosphor exhibited improved lumen output over untreated control phosphor. Therefore, the invention contemplates the use of large amounts of DTPA; however, no appreciable lumen gain over that achieved by use of the preferred amount have been observed. The upper limit of DTPA used in treating the phosphor is a practical one. Naturally for reasons of economical production it is desirable to achieve the greatest lumen gain with the smallest addition of DTPA. The use of DTPA in an amount of from 0.01 to 1 weight percent of phosphor provides a favorable cost situation.

The DTPA forms very stable metal chelates with excess metal associated with the halophosphate phosphor during treatment. It is thought that the improved phosphor performance results from removal of this excess metal which is apparently not fully incorporated into the phosphor structure. The DTPA metal chelates such as calcium and manganese chelate formed during treatment and removed by washing exhibit stability constants which are demonstratably higher than for EDTA chelates of the same metals. This insures removal of any excess metal associated with the phosphor by preventing subsequent dissociation of the DTPA metal chelates before their removal during washing.

The use of DTPA instead of prior art sequestering agents, such as EDTA, has the additional advantage of not requiring an ammoniacal carrier solution as is required for EDTA treatment. This is a further economy in production.

The phosphor treated with DTPA in an amount of 0.1 weight percent of the halophosphate phosphor shows a 100 hour operating lumen gain of several percent over a control phosphor when the phosphor is incorporated into standard fluorescent lamps. The lumen drop from 0 hour to 100 hour is also considerably lower for the DTPA treated phosphor as compared to an untreated control phosphor.

While the invention has been described with reference to a specific preferred example, it is not to be limited thereto or thereby.

I claim:
1. The method of processing finely divided alkaline earth halophosphate phosphor in order to improve its performance, which method comprises:
   (a) thoroughly wetting said phosphor with a vehicle which has dissolved therein at least 0.01 weight percent of diethylenetriamine pentaacetic acid as measured with respect to the weight of said phosphor; and
   (b) separating said wetted phosphor from said vehicle and said dissolved acid, and thereafter rinsing said phosphor to remove any residuum of said acid.
2. The method as specified in claim 1, wherein said vehicle is deionized water and said phosphor is thoroughly wetted with said vehicle and dissolved acid while simultaneously milling said phosphor to achieve a predetermined particle size for said phosphor.
3. The method as specified in claim 1, wherein prior to wetting with said vehicle and dissolved acid, said phosphor is milled to a predetermined particle size.
4. The method as specified in claim 1, wherein said acid is present in amount of from 0.01 to 1% by weight of said phosphor.
5. The method as specified in claim 1, wherein said acid is present in amount of about 0.1 weight percent of said phosphor.
6. The method as specified in claim 1, wherein after washing with said acid, said phosphor is additionally washed with a dilute solution of nitric acid.
7. The method as specified in claim 1, wherein said phosphor is rinsed to remove any residual amount of said acid by washing same with deionized distilled water.

References Cited

UNITED STATES PATENTS

| | | |
|---|---|---|
| 3,047,512 | 7/1962 | Martyny. |
| 3,060,129 | 10/1962 | Hoekstra et al. |
| 3,384,598 | 5/1968 | Friedman et al. |

TOBIAS E. LEVOW, Primary Examiner

R. D. EDMONDS, Assistant Examiner

U.S. Cl. X.R.

252—301.6